(No Model.)
T. YORK.
DISH COVER.
No. 519,417. Patented May 8, 1894.
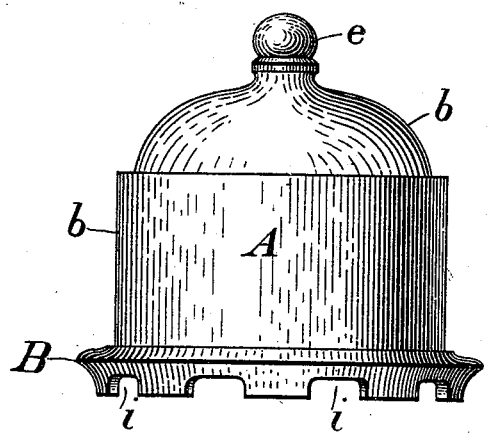
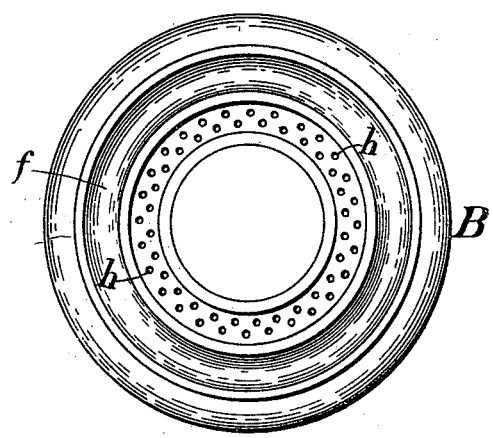
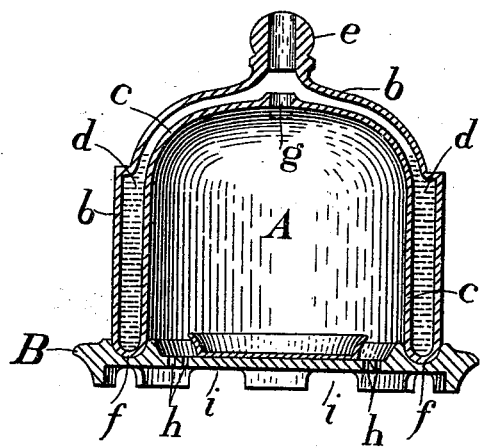
Witnesses
Jas. E. Smith.
Chas. F. Benjamin.
Inventor:
Thomas York
By Rich'd McAllister,
Attorney.

UNITED STATES PATENT OFFICE.

THOMAS YORK, OF PORTSMOUTH, OHIO.

DISH-COVER.

SPECIFICATION forming part of Letters Patent No. 519,417, dated May 8, 1894.

Application filed March 28, 1894. Serial No. 505,451. (No model.)

*To all whom it may concern:*

Be it known that I, THOMAS YORK, a citizen of the United States, residing at Portsmouth, in the county of Scioto and State of Ohio, have invented certain new and useful Improvements in Dish-Covers; and I do hereby declare the following to be a full, clear, and exact description of the invention, such as will enable others skilled in the art to which it appertains to make and use the same.

This invention relates to certain improvements in the dish cover shown and described in the Letters Patent of the United States, numbered 508,198, issued November 7, 1893, to Robert Abbott and myself.

The object of the invention is to increase the power and efficiency of the cold air current by means of which the cooling of the contents of the dish combined with the cover is accomplished.

In the accompanying drawings: Figure 1 is an exterior elevation of a dish and cover provided with my improvements; Fig. 2, a top plan of the dish, and Fig. 3, a vertical section showing the interior construction.

The parts reproduced from the Abbott and York patent, above mentioned, are designated by the same reference letters as in that patent.

Briefly stated, the improvement consists in carrying the aperture in the knob $e$ of the aforesaid patent through the inner wall $c$ thereof, and aperturing the rim of the dish or vessel B, so that a draft may be created, to cause the constant passage of air through the apertures below into the dome of the cover A, and out through the aperture in the knob.

A represents the cover; $b$ and $c$ its outer and inner walls, respectively, and $e$ the apertured knob.

In my improvement, $g$ represents the aperture I make in the inner wall, and $h$ the apertures I make in the rim of the dish or vessel, B; being careful to put them within the circumference of the groove $f$ of the dish or vessel rim, so that the air entering the apertures $h$ is confined within the dome of the cover and escapes only through the draft aperture $g$, above. By providing recesses, $i$, in the foot or stand of the dish, a free supply of air to the interior is assured.

I have found, in the practical use of the patented invention, and of the present device, that the evaporation of the water through the porous walls of the cover is hastened by the creation of a constant draft of air within the dome by the means I have devised, and that the cooling effects are much improved, as against the original device of confining a supply of air within the dome space and changing it only at intervals by lifting the cover, or by a slow process of escape and entrance.

I claim—

The improvement which consists in providing the cover A with the aperture $g$ in the inner wall thereof, and the dish B with the orifices $h$, in the manner described; for the purpose of creating a constant current of air through the interior of the combined dish and cover, whereby the cooling properties of the said apparatus are materially increased.

In testimony whereof I affix my signature in presence of two witnesses.

THOMAS YORK.

Witnesses:
  CHAS. E. MOLSTER,
  WILLIAM L. PARKER.